(12) United States Patent
Nakamura et al.

(10) Patent No.: US 9,368,249 B2
(45) Date of Patent: Jun. 14, 2016

(54) METHOD OF MANUFACTURING AN ELECTRODE FOR AN ENERGY STORAGE DEVICE

(75) Inventors: Katsuji Nakamura, Fukuoka (JP); Kaichi Tsuruta, Tochigi (JP); Yuji Ozaki, Tochigi (JP); Shigeaki Watarai, Saitama (JP); Hidenori Takagi, Yamanashi (JP); Yutaka Ohori, Yamanashi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 397 days.

(21) Appl. No.: 13/806,104

(22) PCT Filed: Jun. 14, 2011

(86) PCT No.: PCT/JP2011/063575
§ 371 (c)(1),
(2), (4) Date: Dec. 20, 2012

(87) PCT Pub. No.: WO2011/162126
PCT Pub. Date: Dec. 29, 2011

(65) Prior Publication Data
US 2013/0133924 A1    May 30, 2013

(30) Foreign Application Priority Data

Jun. 25, 2010   (JP) .................................. 2010-145566

(51) Int. Cl.
*H01R 43/16* (2006.01)
*H01B 1/02* (2006.01)
(Continued)

(52) U.S. Cl.
CPC ............ *H01B 1/023* (2013.01); *C23C 18/1651* (2013.01); *C23C 18/1653* (2013.01);
(Continued)

(58) Field of Classification Search
CPC  C25D 5/12; Y10T 428/12736; C23C 28/021; C23C 28/023; C23C 28/025; C23C 2/12; C23C 18/54

USPC ................ 29/874, 623.1, 842, 847, 878, 884; 429/96, 245
See application file for complete search history.

(56) References Cited

U.S. PATENT DOCUMENTS

| 7,258,951 B2 * | 8/2007 | Woo ...................... H01M 4/131 29/623.1 |
| 9,034,500 B2 * | 5/2015 | Kusama ................ H01M 2/263 429/96 |
| 2008/0102362 A1 | 5/2008 | Nii et al. |

FOREIGN PATENT DOCUMENTS

| CN | 101170171 A | 4/2008 |
| EP | 1215691 A1 | 6/2002 |

(Continued)

OTHER PUBLICATIONS

Japanese Patent Office, Notification of Rejection Reason(s), Application No. 2010-145566, mailed Nov. 12, 2013, including English translation.
Examination Report from the Taiwan intellectual Property Office for TW 100121005 dated Sep. 16, 2015, 12 pages.
International Search Report PCT/JP2011/063575, completed Sep. 9, 2011 and mailed Sep. 20, 2011, 2 pages.
European Supplemental Search Report prepared by the European Patent Office for EP 11793012, mailed Dec. 21, 2015, 7 pages.

*Primary Examiner* — Thiem Phan
(74) *Attorney, Agent, or Firm* — Chernoff, Vilhauer, McClung & Stenzel, LLP

(57) ABSTRACT

Zn layer 21 or Zn alloy layer, Ni layer 22, and Sn layer 23 or Sn alloy layer are formed on a connecting terminal part 10*a* of a positive electrode composed of Al by plating. Accordingly, this can solder Cu negative electrode, which is composed of metal that is different species from Al, through Sn layer 23 or Sn alloy layer so that jointing strength of the Al positive electrode and the Cu negative electrode can be enhanced. Further, since the contacting area is increased in comparison with the conventional jointing by the spot-welding or the conventional fastening by a bolt so that the resistance value at the contacting point is reduced, the voltage drop of the energy storage device by contact resistance can be reduced.

3 Claims, 6 Drawing Sheets

(51) Int. Cl.
*C23C 18/16* (2006.01)
*C23C 18/18* (2006.01)
*C23C 18/54* (2006.01)
*H01G 11/24* (2013.01)
*H01G 11/66* (2013.01)
*H01M 2/20* (2006.01)
*H01M 2/30* (2006.01)
*H01B 13/32* (2006.01)
*C25D 5/12* (2006.01)
*C25D 5/44* (2006.01)
*C23C 18/36* (2006.01)
*C23C 18/52* (2006.01)

(52) U.S. Cl.
CPC ............ *C23C18/1827* (2013.01); *C23C 18/54* (2013.01); *C25D 5/12* (2013.01); *C25D 5/44* (2013.01); *H01B 13/32* (2013.01); *H01G 11/24* (2013.01); *H01G 11/66* (2013.01); *H01M 2/202* (2013.01); *H01M 2/30* (2013.01); *C23C 18/36* (2013.01); *C23C 18/52* (2013.01); *Y02E 60/13* (2013.01)

(56) References Cited

FOREIGN PATENT DOCUMENTS

| | | |
|---|---|---|
| JP | 61115667 | 6/1986 |
| JP | 05029741 | 2/1993 |
| JP | H07157884 A | 6/1995 |
| JP | 2000090907 | 3/2000 |
| JP | 2003-077451 | 3/2003 |
| JP | 2005209735 | 8/2005 |
| JP | 2006-041435 | 2/2006 |
| JP | 2006-245442 | 9/2006 |
| JP | 2008108584 | 5/2008 |
| JP | 2009-146979 | 7/2009 |
| JP | 2010065916 | 3/2010 |
| JP | 2010-118625 | 5/2010 |
| JP | 2010-118625 A | 5/2010 |
| KR | 1020080037494 | 4/2008 |
| TW | 560098 B | 11/2003 |
| TW | 591677 B | 6/2004 |

\* cited by examiner

FIG.4

| | RESULT EXAMPLE OF SALT WATER SPRAY TEST ||
| | AFTER 120h | AFTER 600h |
|---|---|---|
| EMBODIMENT 1 | PITTING CORROSION: NONE<br>WHITE POWDER: NONE | PITTING CORROSION: NONE<br>WHITE POWDER: SMALL AMOUNT |
| COMPARISON EXAMPLE 1 | PITTING CORROSION: FOUND<br>WHITE POWDER: NONE | PITTING CORROSION: FOUND<br>WHITE POWDER: LARGE AMOUNT |
| COMPARISON EXAMPLE 2 | PITTING CORROSION: NONE<br>WHITE POWDER: FOUND | PITTING CORROSION: NONE<br>WHITE POWDER: LARGE AMOUNT |

METHOD OF MANUFACTURING AN ELECTRODE FOR AN ENERGY STORAGE DEVICE

CROSS-REFERENCE TO RELATED APPLICATION

This is a national stage application filed under 35 USC 371 based on International Application No. PCT/JP2011/063575 filed Jun. 14, 2011, and claims priority under 35 USC 119 of Japanese Patent Application No. 2010145566 filed Jun. 25, 2010.

TECHNICAL FIELD

The present invention relates to an electrode for energy storage device such as electric double layer capacitor, lithium ion capacitor and secondary battery, which is capable of storing any electric energy, a manufacturing method thereof and a connecting method thereof.

BACKGROUND TECHNOLOGY

The lithium ion capacitor is expected as being substituted for the electric double layer capacitor or the secondary battery. This lithium ion capacitor is an energy storage capacitor, energy storage efficiency of which is remarkably enhanced by utilizing physical phenomenon of pre-doping of ion to negative electrode. At the present time, the electric double layer capacitor has been used for storing electricity generated by a cell motor in a large-sized machine such as a train and a construction machine but will be expected in the near future as being applying it to an energy storage in fuel cell for a vehicle or the like by downsizing thereof.

The lithium ion capacitor has asymmetrical electrode structure. Accordingly, it has merits such that its voltage is higher than that of the electric double layer capacitor, its internal resistance is less than that of the secondary battery, charge and discharge are carried out for a short time of period, and any degradation by the charge and discharge is limited so that it has a long life for goods. The lithium ion capacitor, however, has demerit of less energy density. The capacitor includes a roll type capacitor, a laminate type capacitor and the like, and each has two electrodes of positive and negative electrodes.

The two electrodes which the lithium ion capacitor has are respectively composed of different species of metals. For example, Al or the like is used as a lead electrode for positive electrode and Cu or the like is used as a lead electrode for negative electrode. When a large amount of discharge energy is required, parallel connection thereof is used whereas when high voltage is required, series connection is used.

As a connecting method of the lead electrodes which are used in the conventional electric double layer capacitor, lithium ion capacitor and secondary battery of laminate type, there are a connecting method of them in which foil-like lead electrodes are used and they are connected by spot-welding using ultrasonic wave or the like (see a patent document 1), a method of connecting them by bodies of revolution contacting the lead electrodes while being pressed (see a patent document 2) and a method of fastening the foil-like lead electrodes by a bolt or the like.

PRIOR ART DOCUMENTS

Patent Documents

Patent Document 1: Japanese Patent Application Publication No. 2000-90907
Patent Document 2: Japanese Patent Application Publication No. 2005-209735

SUMMARY OF THE INVENTION

Problems to be Solved by the Invention

However, in the connecting method of electrodes by the spot-welding described in the patent document 1, in a case where electrodes of the same species of metal are jointed like connection of Al electrode and Al electrode or connection of Cu electrode and Cu electrode (parallel connection), high jointing strength is obtained whereas in a case where electrodes of the different species of metals are jointed like connection of Al electrode and Cu electrode (series connection), low jointing strength is obtained so that connection reliability has been poor.

Further, by the method of connecting the electrodes by bodies of revolution, which has described in the patent document 2, and the method of connecting the electrodes by fastening them by a bolt, a contacting area is small and resistance value at the contacting point becomes high so that a large voltage drop occurs.

When such a voltage drop by the contact resistance occurs, the voltage that is supplied to electrical equipment or the like which is a load drops to a level that is less than the voltage of the energy storage device.

Thus, the present invention solves the above discussed problems and has an object to provide an electrode for energy storage device, a manufacturing method thereof and a connecting method thereof by which jointing strength of electrodes of different species of metals can be enhanced, a contacting area is increased in comparison with the conventional jointing by the spot-welding or the conventional fastening by a bolt so that the resistance value at the contacting point is reduced, and the voltage of the energy storage device can be effectively supplied without any drop of the voltage thereof.

Means for Solving the Problems

The inventors have found out that if the lead electrodes of the energy storage device is able to be connected to each other by solder, the lead electrodes may be connected over their entire surfaces so that jointing strength of the lead electrodes becomes strong and when the lead electrodes may be connected over their entire surfaces, the contact area thereof is increased, thereby reducing the resistance value at the contacting point, and have completed this invention.

An electrode for energy storage device according to this invention is characterized in that Zn layer or Zn alloy layer, Ni layer, and Sn layer or Sn alloy layer are formed on a positive electrode containing Al by plating.

In the electrode for energy storage device according to this invention, the Zn layer or the Zn alloy layer, the Ni layer, and the Sn layer or the Sn alloy layer are formed on the positive electrode containing Al by plating. This enables it to solder a negative electrode composed of metal, which is different species from Al, on the Sn layer or the Sn alloy layer.

Al is mainly used for a lead electrode in a positive electrode of the energy storage device (hereinafter, referred to as "Al positive electrode") but common solder is unavailable to solder Al. As the solder for Al, Sn-15Zn (mass %) and Sn-30Zn (mass %) have been known but such solder solders Al by an action of Zn so that no problem occur in a case of connecting Al positive electrodes to each other. However, when Al positive electrode is soldered with Cu electrode as negative electrode (hereinafter, referred to as "Cu negative electrode"), a phenomenon of Kirkendall voids in which Zn ions in Sn—Zn solder move to Cu under high temperature and high humidity appears, so that solder jointing strength is degraded. Particularly, since charge and discharge are repeated in the electric double layer capacitor, lithium ion capacitor and secondary battery, they are subject to a generation of heat. The Sn—Zn solder is also subject to oxidization which degrades electric conductivity thereof. Accordingly, it is not desirable to joint Al positive electrode and Cu negative electrode directly using the Sn—Zn solder as brazing material.

It is also conceivable to cover any metal that is solderable to the Cu negative electrode on the Al positive electrode by plating. However, Sn plating or Sn alloy plating which is excellent for solderability with the Cu negative electrode cannot be completed on Al as it are because standard electrode potential of Sn is −0.138V and standard electrode potential of Al is −1.1662V so that standard electrode potential difference between Al and Cu is 1.524V.

In this invention, by covering the Al positive electrode with the Zn layer or the Zn alloy layer, a film of Zn or Zn alloy which is excellent for adhesiveness with the Al positive electrode is formed. When forming Sn layer or solder (Sn alloy layer) on the film, Al positive electrode which is excellent for solderability with Cu negative electrode is obtained.

The film of Zn layer or Zn alloy layer covered on the Al positive electrode is formed by using plating method. In the plating method, Zn itself is often plated normally but Zn—Ni alloy plating such as Zn-6-16% Ni, which is an example of Zn ally plating, can be formed in the same zincate bath as that of Zn. As other Zn ally plating which can be formed by the plating method, Zn—Fe plating, Zn—Al plating or the like has been known.

Since it is difficult to form Sn layer plating or Sn alloy layer plating in the following step when a surface of the plating is Zn plating as it is, it is desirable that Ni plating covers Zn plating as undercoat of the Sn layer or Sn alloy layer. Placing Ni layer on the Zn plating allows adhesiveness of the Sn layer or Sn alloy layer to be enhanced. The Ni layer between the Zn layer and the Sn layer acts as physical barrier. In other words, the Ni layer prevents the degradation of jointing strength, which is dependent on Kirkendall voids that occur when Zn covering the Al positive electrode moves to the Cu negative electrode.

The Zn layer or the Zn alloy layer and the Sn layer or the Sn alloy layer in this invention may be formed by electroplating or electroless plating. By such plating methods, all the steps are not only unified with plating but also any electrode for energy storage device having a film thickness with high precision is obtained. Further, since the thin film thickness can be formed, the lead is excellent for being foldable. By the way, it is difficult to perform soldering because Sn or Sn alloy layer of the electrode for energy storage device in this invention is thin when Sn layer or Sn alloy layer is formed by plating so that it is desirable that the soldering is performed using resin flux cored solder. The Sn layer or the Sn alloy layer is covered in order to perform the soldering easily with resin flux cored solder or the like.

A manufacturing method of electrode for energy storage device according to this invention is characterized in that the method comprising a degreasing step of degreasing a surface of a positive electrode containing Al by organic solvent, an etching step of etching the surface of the positive electrode degreased in the degreasing step by etchant, a Zn plating step of forming Zn plating on the surface of the positive electrode etched in the etching step by liquid zincate, a Ni plating step of forming Ni plating on a surface of the Zn plating formed in the Zn plating step by Ni plating solution, and a Sn plating step of forming Sn plating on a surface of the Ni plating formed in the Ni plating step by Sn plating solution.

Further, a connecting method of electrode for energy storage device according to this invention is characterized in that the method comprising a step of connecting a positive electrode in which Zn layer or Zn alloy layer, Ni layer, and Sn layer or Sn alloy layer are formed on the positive electrode containing Al by plating and a negative electrode containing Cu by soldering using Sn or solder.

Effect of the Invention

In the electrode for energy storage device, the manufacturing method thereof and the connecting method thereof according to this invention, the positive electrode containing Al and the negative electrode containing metal, which is different species from Al, can be soldered so that jointing strength between the positive electrode and the negative electrode can be enhanced. Further, the contacting area is increased in comparison with the conventional jointing by the spot-welding or the conventional fastening by a bolt so that the resistance value at the contacting point is reduced, thereby enabling the voltage drop of the energy storage device by contact resistance to be reduced. As a result thereof, it is possible to supply the voltage of the energy storage device effectively to a load without any drop of the voltage thereof.

BRIEF DESCRIPTION OF THE DRAWINGS

FIG. 4 is a set of photographs showing the results of an environmental test.

EMBODIMENTS FOR CARRYING OUT THE INVENTION

The following will describe energy storage device according to this invention such as electric double layer capacitor, lithium ion capacitor and secondary battery with reference to the drawings.

Configuration Example of Energy Storage Device 100

Figure 1:
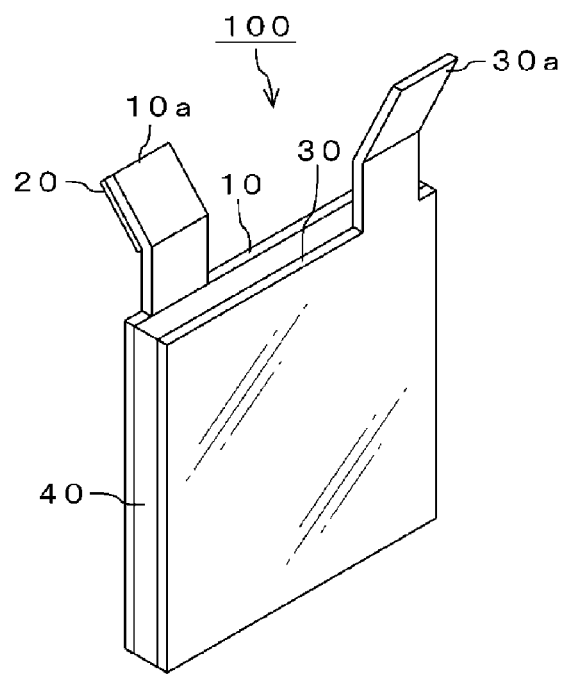
FIG. 1 is a perspective view of energy storage device 100 according to this invention showing a configuration example thereof.

First, the following will describe a configuration example of an energy storage device 100 according to this invention. As shown in FIG. 1, the energy storage device 100 is composed of a lead electrode in a positive electrode composed of Al (hereinafter, referred to as "Al positive electrode 10"), a lead electrode in a negative electrode composed of Cu (hereinafter, referred to as "Cu negative electrode 30"), which is different species from Al, and a separator 40.

The Al positive electrode 10 and the Cu negative electrode 30 are respectively provided with connecting terminal parts 10a, 30a extending from their ends. Regarding the connecting terminal parts 10a, 30a, when connecting the energy storage devices 100 in series, the connecting terminal part 10a and the connecting terminal part 30a are connected to each other, whereas when connecting the energy storage devices 100 in parallel, the connecting terminal parts 10a are connected to each other or the connecting terminal parts 30a are connected to each other. Further, the connecting terminal parts 10a, 30a are also external connecting terminals when they do not connect the energy storage devices 100 in series nor in parallel.

Plating layers 20 are formed on the connecting terminal part 10a. The plating layers 20 are formed in order to connect the connecting terminal part 10a and the connecting terminal part 30a easily and surely.

Configuration Example of Plating Layers 20

Figure 2:
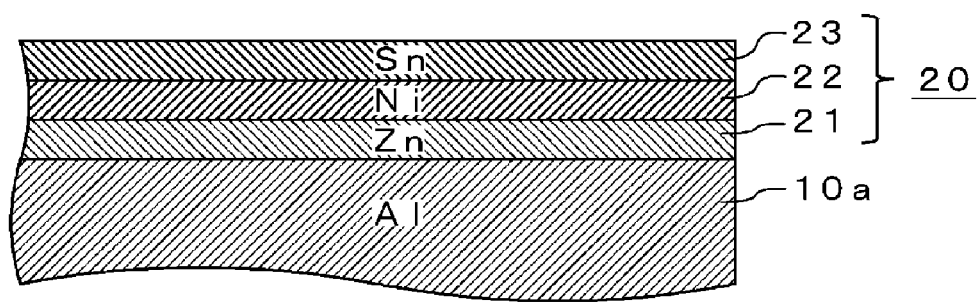
FIG. 2 is a cross sectional view of plating layers 20 for showing a configuration example thereof.

As shown in FIG. 2, the plating layers 20 are formed so that the Zn layer 21, the Ni layer 22, and the Sn layer 23 are formed on the connecting terminal part 10a composed of Al by plating. It is to be noted that Zn layer 21 may be Zn alloy layer and Sn layer 23 may be Sn alloy layer. For example, Zn alloy layer is Zn—Ni alloy, Zn—Fe alloy, Zn—Al alloy or the like and Sn alloy layer is Sn—Bi alloy, Sn—Ag alloy, Sn—Cu alloy or the like.

Thicknesses of the Zn layer 21, the Ni layer 22, and the Sn layer 23 exert an influence on reliability of the connection of the Al positive electrode 10 and the Cu negative electrode 30. When the thickness of the Zn layer 21 is 0.01 µm or less, the Ni layer 22 is hard to be formed on the Zn layer 21, whereas when the thickness of the Zn layer 21 is 0.15 µm or more, adhesiveness between the connecting terminal part 10a of Al and the Zn layer 21 becomes poor so that this portion may be peeled off. It is preferable that the thickness of the Zn layer 21 is 0.05 through 0.1 µm.

Further, when plating the Zn layer 21, alkaline bath is suitable for enhancing the adhesiveness to the connecting terminal part 10a of Al. For example, zincate bath in which ZnO, Zn, NaOH and the like are dissolved by water or cyanide bath in which cyanide such as NaCN is added to the zincate bath are suitable therefor. The plating based on the zincate bath or the cyanide bath is less effective by only once because a surface of the connecting terminal part 10a of Al is subject to oxidation so that the processes by two times or more are required.

Regarding the Ni layer 22, when the thickness of the Ni layer 22 is too thin, a barrier effect between the Zn layer 21 and the Sn layer 23 is lost whereas when it is too thick, the Ni layer 22 and the Cu negative electrode 30 are reacted when soldering so that any intermetallic compounds such as $Cu_3Sn$ and $Cu_6Sn_5$ are formed. Since the intermetallic compounds such as $Cu_3Sn$ and $Cu_6Sn_5$ are hard and breakable, they are suitable for any electrodes. Accordingly, it is preferable that the thickness of the Ni layer 22 is 1 through 3 µm, more preferably, 2 through 3 µm.

Regarding the Sn layer 23, when the thickness of the Sn layer 23 is too thin, Ni in the Ni layer 22 is oxidized so that solderability to the Cu negative electrode 30 becomes poor whereas when it is too thick, a portion of the Sn layer 23 is easy to be broken when performing folding on the Al positive electrode 10. Accordingly, it is preferable that the thickness of the Sn layer 23 is 5 through 15 µm.

Connecting Example of Energy Storage Devices 100

Figure 3:
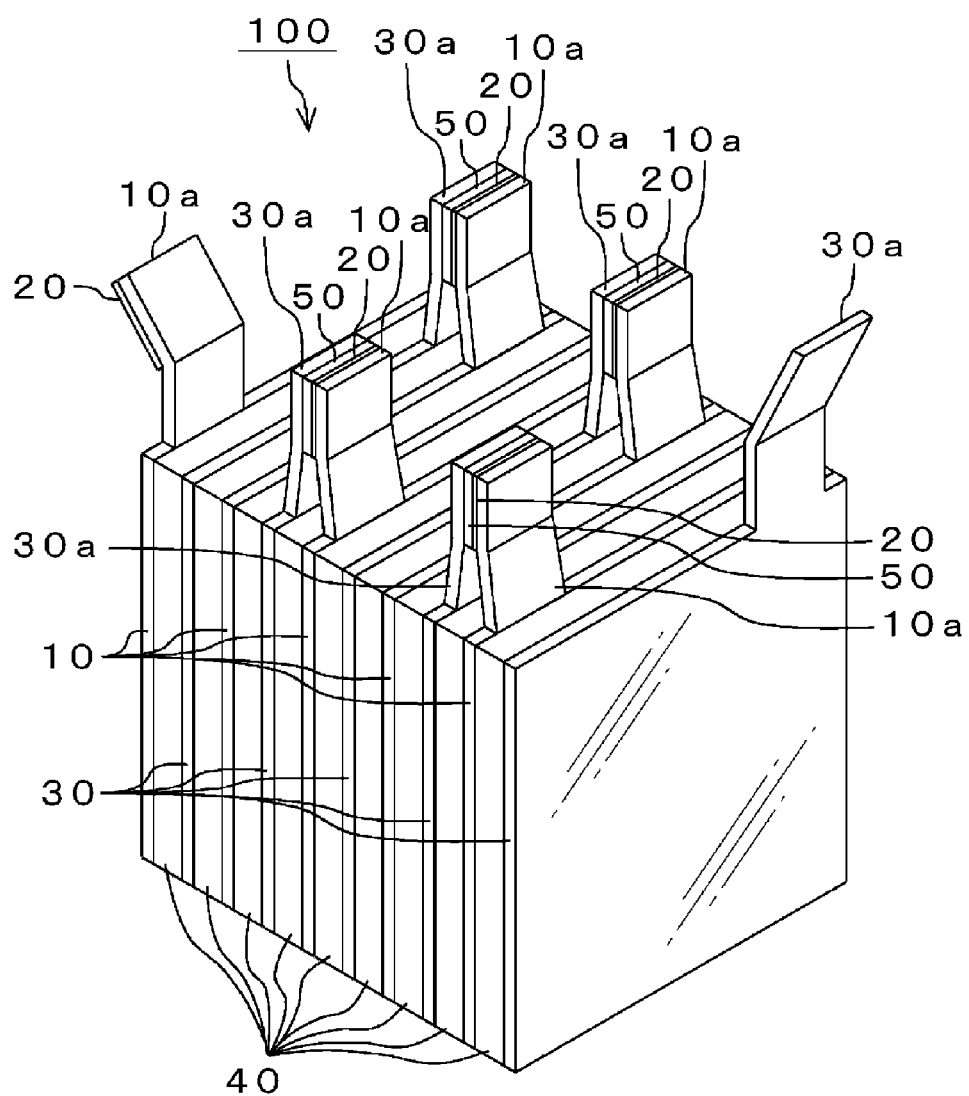
FIG. 3 is a perspective view of the energy storage device 100 for showing a connecting example thereof.

Next, the following will describe a connecting example of the energy storage devices 100. As shown in FIG. 3, when connecting the energy storage devices 100 in series, their connecting terminal parts 10a and their connecting terminal parts 30a are connected to each other through the plating layers 20 and solder 50. The solder 50 is hard to solder Al of the connecting terminal part 10a but is easy to solder the connecting terminal parts 30a of Cu and the plating layers 20. By the way, the solder 50 may be leaded solder or lead-free solder composed of Sn—Ag—Cu or Sn—Zn.

Accordingly, since the Al positive electrode 10 and the Cu negative electrode 30 can be soldered through the plating layers 20, jointing strength between the Al positive electrode 10 and the Cu negative electrode 30 can be enhanced. Further, since the contacting area between the connecting terminal part 10a and the connecting terminal part 30a is increased in comparison with the conventional jointing by the spot-welding or the conventional fastening by a bolt so that the resistance value at the contacting point (referred to as a point by which the connecting terminal part 10a and the connecting terminal part 30a are contacted) is reduced, the voltage drop of the energy storage device 100 by contact resistance can be reduced. As a result thereof, it is possible to supply the voltage of the energy storage device 100 effectively to a load without any drop of the voltage thereof.

Additionally, although the negative electrode composed of Cu has been described in this embodiment, this invention is not limited thereto: This invention is applicable for any negative electrodes of metal which is different species from Al.

Embodiment 1

Next, the following will describe a manufacturing method of the plating layers 20 formed on the Al positive electrode 10 of the energy storage device 100 according to this invention. The plating layers 20 are manufactured according to the following procedures 1 through 5.

<1. Degreasing Step>

The connecting terminal part 10a having a dimension of a length of 70 mm, a width of 50 mm, and a thickness of 0.2 mm is dipped and degreased by using organic solvent.

<2. Etching Step>

The degreased connecting terminal part 10a is washed by water and alkali-etched and then, is dipped into acid solution (etchant) so that its surface is made rough. By this step, the connecting terminal part 10a composed of Al and the Zn layer 21 are favorably adhered closely to each other.

<3. Zn Plating Step>

The etched connecting terminal part 10a is dipped into zincate bath in which ZnO, Zn, NaOH and the like are dissolved with water to form Zn plating (Zn layer 21).

In order to wash liquid zincate adhered to Zn-plated connecting terminal part 10a, it is washed by water and the connecting terminal part 10a is then dipped into nitric acid to peel off the zincate (Zn and the like).

Again, the connecting terminal part 10a is dipped into the zincate bath to form Zn plating and after it is washed by water, it is dipped into the nitric acid to peel off the zincate (Zn and the like).

It is to be noted that in a case where Zn—Ni alloy plating is formed in place of the above-mentioned Zn plating, zincate bath in which $ZnCl_2$, $NiCl_2$ and the like are added to the zincate bath is used.

<4. Ni Plating Step>

The connecting terminal part 10a on which the Zn plating has been formed is dipped into electroless Ni plating bath in which $NiSO_4 \cdot 6H_2O$, $NaH_2PO_4$ and the like are dissolved with water for about 300 seconds to form Ni plating (Ni layer 22)

and is washed by water. It is to be noted that Ni plating is not limited to the electroless plating, it may use any electroplating.

<5. Sn Plating Step>

The connecting terminal part 10a on which the Ni plating has been formed is dipped into alkaline or acidic Sn plating bath in which $Na_2SO_3 \cdot 3H_2O$, Sn, $NaOH_2$ and the like are dissolved with water for about 20 minutes to form Sn plating (Sn layer 23) and is washed by water. It is then dried to complete the plating layers 20.

The film thickness of each of the plating layers 20 manufactured according to the above-mentioned steps 1 through 5 was measured by an X-ray fluorescence film thickness gauge, so that a thickness of Zn layer 21 was 0.05 μm, a thickness of Ni layer 22 was 1.5 μm, and a thickness of Sn layer 23 was 7 μm.

Embodiment 2

The Al positive electrode 10 having the plating layers 20 formed by the first embodiment and the Cu negative electrode 30 are soldered to each other using resin flux cored solder. As the resin flux cored solder, RMA08 (manufactured by SENJU METAL INDUSTRY Co., LTD) is used, and it is soldered under a condition such that temperature of a tip of soldering iron is 300 degrees C. and a period of time for soldering is 10 seconds.

As a comparison example 1, it is made such that Al positive electrode and Cu negative electrode are directly soldered by wire solder composed of Sn-15Zn (mass %). Incidentally, in this soldering, the soldering is carried out with flux being used.

As a comparison example 2, it is made such that Al positive electrode and Cu negative electrode are connected to each other by the spot-welding using ultrasonic wave.

In Table 1, a measured result of jointing strength of the Al positive electrode and the Cu negative electrode in each of the embodiment 1 and the comparison examples 1 and 2 is shown. By the way, this jointing strength was measured by an adhesive strength tester based on HS H8630 and JIS C6481 (numbers of samples are 5). Further, jointing strength thereof after the samples are oxidized acceleratingly was measured. The oxidation acceleration condition was such that the samples were positioned into a thermostat oven having ambience temperature of 85 degrees C. and humidity of 85% for 24 hours and an electric current of 100 A in which ON/OFF were repeated every second flowed through the samples.

TABLE 1

| | JOINTING STRENGTH (kg/cm) | | |
| --- | --- | --- | --- |
| | BEFORE OXIDATION ACCELERATION | AFTER OXIDATION ACCELERATION | DIF-FER-ENCE |
| EMBODYMENT 1 | 5.9 | 4.5 | 1.4 |
| COMPARISON EXAMPLE 1 | 5.3 | 3.8 | 1.5 |
| COMPARISON EXAMPLE 2 | 2.9 | 0.71 | 2.19 |

As shown in Table 1, the jointing strength before the oxidation acceleration of the embodiment 1 was 5.9 kg/cm; that of the comparison example 1 was 5.3 kg/cm; and that of the comparison example 2 was 2.9 kg/cm. Thus, it is seen that the jointing strength of embodiment 1 is enhanced over those of the comparison examples 1 and 2.

The jointing strength after the oxidation acceleration of the embodiment 1 was 4.5 kg/cm; that of the comparison example 1 was 3.8 kg/cm; and that of the comparison example 2 was 0.71 kg/cm. Thus, it is seen that the jointing strength of embodiment 1 is enhanced over those of the comparison examples 1 and 2 even after the oxidation acceleration.

The difference between the jointing strengths before and after the oxidation acceleration of the embodiment 1 is 1.4 kg/cm; that of the comparison example 1 was 1.5 kg/cm; and that of the comparison example 2 was 2.19 kg/cm. Thus, it is seen that the difference between the jointing strengths before and after the oxidation acceleration in embodiment 1 is smaller than those of the comparison examples 1 and 2 and the jointing reliability thereof is improved.

FIG. 4 shows photographically a result of an environmental test when salt water is sprayed onto the embodiment 1 and the comparison examples 1 and 2 is shown (conditions of the Al positive electrode and the Cu negative electrode after 120 hours and 600 hours from a start of the test). By the way, this environmental test is based on JIS C0024.

As shown in FIG. 4, pitting corrosion and white powder do not occur in the embodiment 1 after 120 hours from the start of test but a small amount of white powders occurs in the embodiment 1 after 600 hours. Pitting corrosion occurs in the comparison example 1 after 120 hours from the start of test and a large amount of white powders occurs in the comparison example 1 after 600 hours. White powder occurs in the comparison example 2 after 120 hours from the start of test and a large amount of white powders occurs in the comparison example 2 after 600 hours. Thus, the occurrence of pitting corrosion and/or the occurrence of a large amount of white powders cause electric conductivity and/or strength of the electrode for energy storage device to be deteriorated.

Accordingly, in the embodiment 1, no pitting corrosion occur and only a small amount of white powders such that any influence is not exerted upon the electric conductivity and/or the strength occurs. In other words, it is seen that the embodiment 1 has good electric conductivity and has reliability as energy storage device. It, however, is seen that the comparison examples 1 and 2 have poor electric conductivity under an environment of the sprayed salt water so that they have poor reliability as energy storage device.

Embodiment 3

Jointed samples were made by the Al positive electrode and the Cu negative electrode of the embodiment 1 and the comparison examples 1 and 2 and resistance value and voltage value of the jointed sample thus made were measured by a microohm meter using Kelvin clips according to four-terminal method. This measurement condition was such that the samples of the embodiment 1 and the comparison examples 1 and 2 were put into a thermostat oven having ambience temperature of 85 degrees C. and humidity of 85% and an electric current of 100 A in which ON/OFF were repeated every second flowed through the samples.

Figure 5:
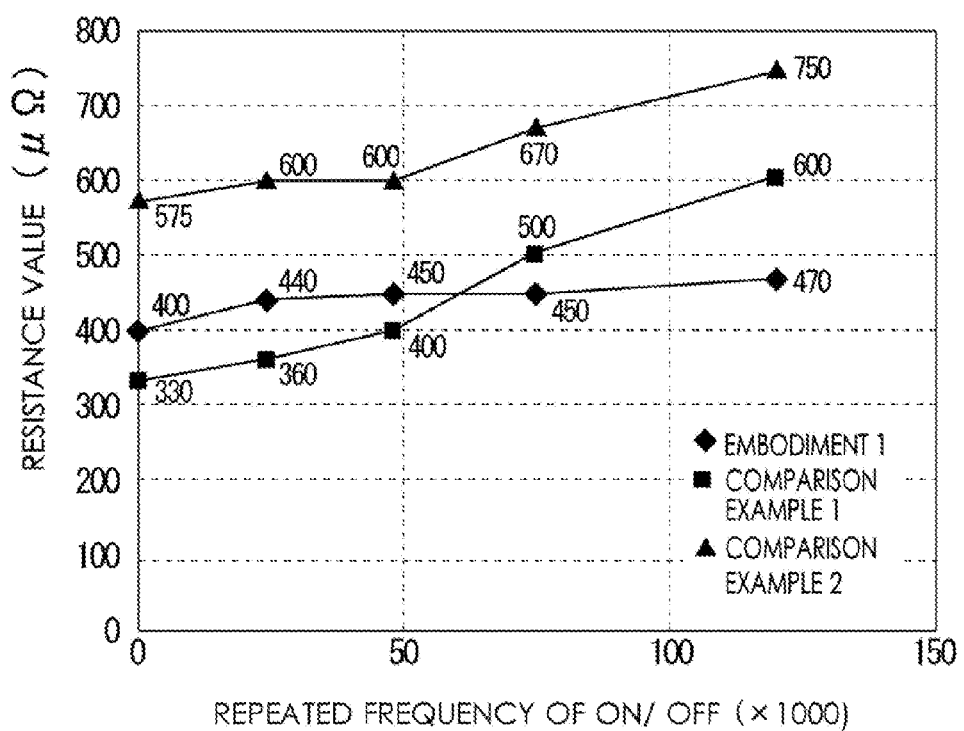
FIG. 5 is a diagram showing characteristics example relating to resistance value of jointed samples.

FIG. 5 is a diagram showing characteristics example relating to resistance value of the jointed samples in which a vertical axis indicates resistance value (μΩ) of the jointed samples and a horizontal axis indicates repeated frequency (×1000) on ON/OFF of electric current of 100 A. As shown in FIG. 5, the resistance values of the jointed sample in the embodiment 1 are shown as diamond-wise points. Its value was 400 μΩ at its initial state, was 440 μΩ after 24000 times of ON/OFF, was 450 μΩ after 48000 times of ON/OFF, was 450 μΩ after 75000 times of ON/OFF, and was 470 μΩ after 120000 times of ON/OFF. The resistance values of the jointed sample in the comparison example 1 are shown as square-wise points. Its value was 330 µΩ at its initial state, was 360 µΩ after 24000 times of ON/OFF, was 400 µΩ after 48000 times of ON/OFF, was 500 µΩ after 75000 times of ON/OFF, and was 600 µΩ after 120000 times of ON/OFF. The resistance values of the jointed sample in the comparison example 2 are shown as triangle-wise points. Its value was 575 µΩ at its initial state, was 600 µΩ after 24000 times of ON/OFF, was 600 µΩ after 48000 times of ON/OFF, was 670 µΩ after 75000 times of ON/OFF, and was 750 µΩ after 120000 times of ON/OFF.

Accordingly, the resistance value of the embodiment 1 after 120000 times of ON/OFF indicates the resistance value of merely 60% though 80% of the resistance values of the comparison examples 1 and 2. Accordingly, the embodiment 1 can reduce electric loss up to about 60% though 80% thereof.

Further, the resistance values of the jointed sample in the embodiment 1 change to merely about 70 µΩ from the initial state thereof to after 120000 times of ON/OFF whereas the resistance values of the jointed sample in the comparison example 1 change even to 270 µΩ as well as the resistance values of the jointed sample in the comparison example 2 change even to 175 µΩ. Namely, the reliability of the embodiment 1 is more improved than those of the comparison examples 1 and 2.

Figure 6:
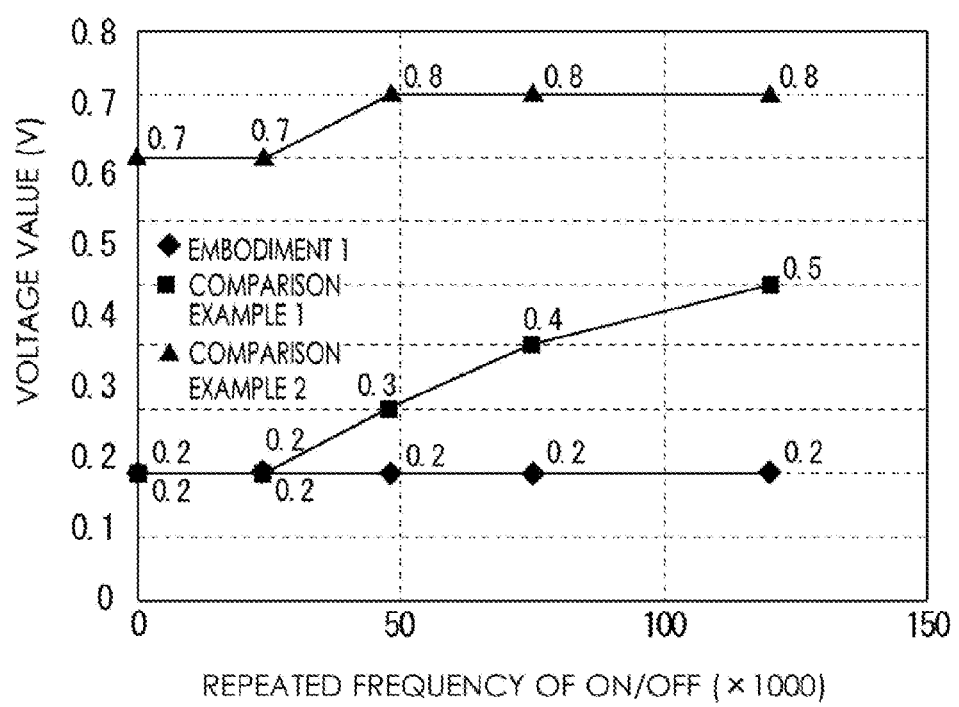
FIG. 6 is a diagram showing characteristics example relating to voltage value of the jointed samples.

FIG. 6 is a diagram showing characteristics example relating to voltage value of the jointed samples in which a vertical axis indicates the voltage value (V) applied to the jointed samples and a horizontal axis indicates repeated frequency (×1000) on ON/OFF of electric current of 100 A. As shown in FIG. 6, the voltage values of the jointed sample in the embodiment 1 are shown as diamond-wise points. Its value was constant at 0.2 V from its initial state up to after 120000 times of ON/OFF. The voltage values of the jointed sample in the comparison example 1 are shown as square-wise points. Its value was 0.2 V at its initial state, was 0.2 V after 24000 times of ON/OFF, was 0.3 V after 48000 times of ON/OFF, was 0.4 V after 75000 times of ON/OFF, and was 0.5 V after 120000 times of ON/OFF. The voltage values of the jointed sample in the comparison example 2 are shown as triangle-wise points. Its value was 0.7 V at its initial state, was 0.7 V after 24000 times of ON/OFF, was 0.8 V after 48000 times of ON/OFF, was 0.8 V after 75000 times of ON/OFF, and was 0.8 V after 120000 times of ON/OFF.

Thus, in the embodiment 1, the voltage values of jointed sample remain unchanged even after 120000 times of ON/OFF, which allows its reliability to be more improved than those of the comparison examples 1 and 2.

Embodiment 4

Jointed samples were made by the Al positive electrode and the Cu negative electrode of the embodiment 1 and the comparison examples 1 and 2 and temperatures of the jointed samples thus made were measured by a thermocouple of K type. This measurement condition was similar to that shown in the embodiment 3 and was such that the samples of the embodiment 1 and the comparison examples 1 and 2 were put into a thermostat oven having ambience temperature of 85 degrees C. and humidity of 85% and an electric current of 100 A in which ON/OFF were repeated every second flowed through the samples.

Figure 7:
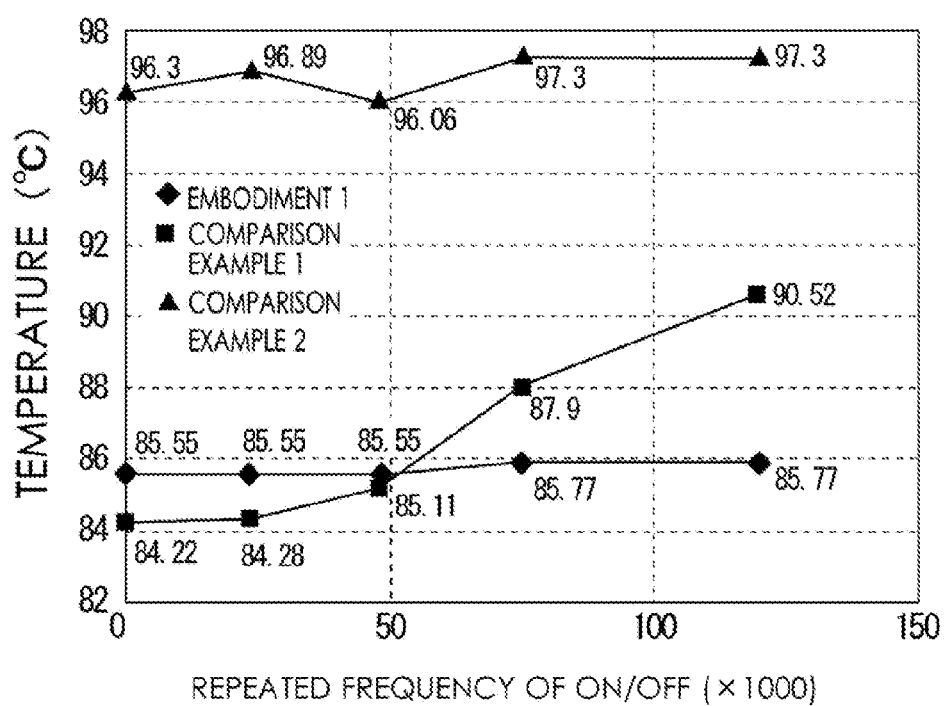
FIG. 7 is a diagram showing characteristics example relating to temperature of the jointed samples.

FIG. 7 is a diagram showing characteristics example relating to temperature of the jointed samples in which a vertical axis indicates the temperature (degrees C.) of the jointed samples and a horizontal axis indicates repeated frequency (×1000) on ON/OFF of electric current of 100 A. As shown in FIG. 7, the temperatures of the jointed sample in the embodiment 1 are shown as diamond-wise points. Its value was 85.55 degrees C. at its initial state, was 85.55 degrees C. after 24000 times of ON/OFF, was 85.55 degrees C. after 48000 times of ON/OFF, was 85.77 degrees C. after 75000 times of ON/OFF, and was 85.77 degrees C. after 120000 times of ON/OFF. The temperatures of the jointed sample in the comparison example 1 are shown as square-wise points. Its value was 84.22 degrees C. at its initial state, was 84.28 degrees C. after 24000 times of ON/OFF, was 85.11 degrees C. after 48000 times of ON/OFF, was 87.9 degrees C. after 75000 times of ON/OFF, and was 90.52 degrees C. after 120000 times of ON/OFF. The temperatures of the jointed sample in the comparison example 2 are shown as triangle-wise points. Its value was 96.3 degrees C. at its initial state, was 96.89 degrees C. after 24000 times of ON/OFF, was 96.06 degrees C. after 48000 times of ON/OFF, was 97.3 degrees C. after 75000 times of ON/OFF, and was 97.3 degrees C. after 120000 times of ON/OFF. These temperature changes are resulted from any changes in the resistance values of the jointed samples and any changes in Joule heat.

Thus, in the embodiment 1, the temperature of the jointed sample remain unchanged even after 120000 times of ON/OFF (because the resistance value of the jointed sample shown in FIG. 4 is low), which allows its reliability to be more improved than those of the comparison examples 1 and 2.

Thus, in the energy storage device 100 according to this invention, the Zn layer 21, the Ni layer 22, and the Sn layer 23 are formed on the Al positive electrode 10 by plating. Accordingly, it is possible to solder the positive electrode to the Cu negative electrode 30 composed of Cu, which is different metal from Al, through Sn layer 23. As a result thereof, jointing strength between the Al positive electrode 10 and the Cu negative electrode 30 can be enhanced.

Further, in the energy storage device 100, since a contacting area between the connecting terminal part 10a and the connecting terminal part 30a is increased in comparison with the conventional jointing by soldering (comparison example 1) or the conventional jointing by the spot-welding using ultrasonic wave (comparison example 2) and the conventional fastening by a bolt so that the resistance value at the contacting point is reduced, the voltage drop of the energy storage device 100 by the contact resistance can be reduced. As a result thereof, it is possible to supply the voltage of the energy storage device 100 to a load effectively without any drop of the voltage thereof.

INDUSTRIAL APPLICABILITY

The energy storage device according to this invention is not limited to box-like one: it is applicable to energy storage device of cylinder type such as electric double layer capacitor, lithium ion capacitor and secondary battery.

EXPLANATION OF CODES

10: Al Positive Electrode
10a, 30a: Connecting Terminal Parts
20: Plating Layers
21: Zn Layer
22: Ni Layer
23: Sn Layer
30: Cu Negative Electrode
40: Separator
50: Solder
100: Energy Storage Device

The invention claimed is:

1. A method of manufacturing an electrode for an energy storage device, comprising:
   forming a positive electrode by:
   forming a layer of Zn or a Zn alloy on a positive electrode containing Al by plating;
   forming a layer of Ni on the layer of Zn or Zn alloy by plating; and
   forming a layer of Sn or Sn alloy on the Ni layer by plating;
   providing a negative electrode containing Cu; and
   connecting the positive electrode to the negative electrode by soldering.

2. The method of claim 1 wherein the step of soldering includes using Sn as the solder.

3. The method of claim 1 further comprising;
   prior to the step of forming a layer of Zn or a Zn alloy, degreasing a surface of the positive electrode containing Al by using an organic solvent and etching the surface of the positive electrode degreased in the degreasing step, by using an etchant;
   performing the Zn plating step of forming a layer of Zn or a Zn alloy by plating on the surface of the positive electrode etched in the etching step by using liquid zincate;
   performing the Ni plating step of forming a layer of Ni on the layer of Zn or a Zn alloy by plating on a surface of the layer of Zn or a Zn alloy formed in the Zn plating step by using a Ni plating solution; and
   performing the Sn plating step of forming a layer of Sn or Sn alloy on a surface of the layer of Ni formed in the Ni plating step by using a Sn plating solution.

* * * * *